United States Patent [19]

Tanaka et al.

[11] Patent Number: 4,568,832
[45] Date of Patent: Feb. 4, 1986

[54] RADIATION IMAGE READ-OUT METHOD AND APPARATUS

[75] Inventors: Hirosi Tanaka; Hisatoyo Kato, both of Kanagawa, Japan

[73] Assignee: Fuji Photo Film Co., Ltd., Kanagawa, Japan

[21] Appl. No.: 501,728

[22] Filed: Jun. 6, 1983

[30] Foreign Application Priority Data

Jun. 4, 1982 [JP] Japan ................................. 57-95900

[51] Int. Cl.[4] ............................................... G03C 5/16
[52] U.S. Cl. ................................ 250/327.2; 250/484.1
[58] Field of Search .................... 250/327.2, 337, 484.1

[56] References Cited

U.S. PATENT DOCUMENTS 4,276,473 6/1981 Kato et al. ...................... 250/327.2
4,284,889 8/1981 Kato et al. ...................... 250/354.1

Primary Examiner—Alfred E. Smith
Assistant Examiner—Carolyn E. Fields
Attorney, Agent, or Firm—Sughrue, Mion, Zinn, Macpeak & Seas

[57] ABSTRACT

In a radiation image read-out system wherein a stimulable phosphor sheet carrying a radiation image stored therein is exposed to stimulating rays which cause it to emit light in proportion to radiation energy stored therein, and the emitted light is photoelectrically read out, preliminary read-out is conducted to investigate the image input information in the stimulable phosphor sheet by use of stimulating rays having a wavelength different from the wavelength of stimulating rays employed in final read-out.

10 Claims, 2 Drawing Figures

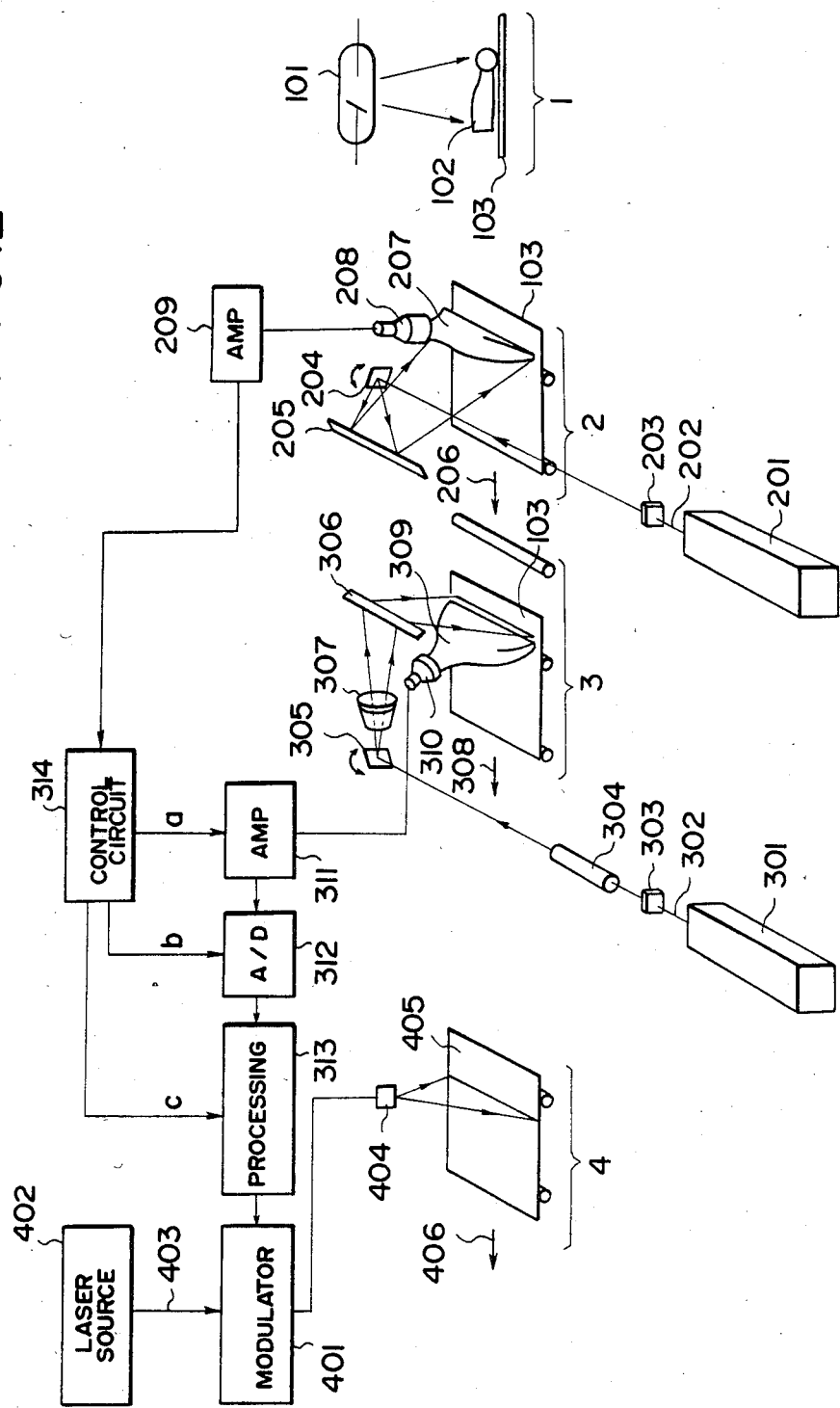

RADIATION IMAGE READ-OUT METHOD AND APPARATUS

BACKGROUND OF THE INVENTION

1. Field of the Invention

This invention relates to a radiation image read-out method in which a stimulable phosphor sheet carrying a radiation image stored therein is exposed to stimulating rays which cause it to emit light in the pattern of the stored image, and the emitted light is photoelectrically read out by a photodetector, and an apparatus for carrying out the method.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and read-out system. Specifically, the stimulable phosphor formed on a sheet is first exposed to a radiation transmitting through an object to have a radiation image stored therein, and is then scanned with stimulating rays such as laser beams which cause it to emit light in the pattern of the stored image. The light emitted from the stimulable phosphor sheet upon stimulation thereof is photoelectrically detected and converted to an electric image signal, which is processed as desired to reproduce a visible image on a recording medium such as photographic light-sensitive material or on a display device such as cathode ray tube (CRT).

This radiation image system using the stimulable phosphor sheet is advantageous over the conventional radiography using a silver halide photographic material in that the image can be recorded over a very wide range of radiation exposure and further in that the electric signal used for reproducing the visible image can be freely processed to improve the image quality for viewing, particularly for diagnostic purposes. In more detail, since the amount of light emitted upon stimulation after the radiation energy is stored in the phosphor varies over a very wide range in proportion to the amount of energy stored therein, it is possible to obtain an image having desirable density regardless of the amount of exposure of the phosphor to the radiation by reading out the emitted light with an appropriate read-out gain and converting it to an electric signal to reproduce a visible image on a recording medium or a display. The electric signal may further be processed as desired to obtain a radiation image suitable for viewing, particularly for diagnostic purposes. This is very advantageous in practical use.

As mentioned above, in the radiation image system using a stimulable phosphor, deviation of the level of the radiation energy stored in the stimulable phosphor from a desired level can easily be corrected by setting the read-out gain to an appropriate value when photoelectrically reading out the light emitted from the stimulable phosphor upon stimulation thereof. Therefore, the quality of the reproduced radiation image is not adversely affected by a change in radiation dose due to fluctuating tube voltage or MAS value of the radiation source, a variation in the sensitivity of the stimulable phosphor or the photodetector, a change in radiation dose according to the condition of the object, or a change in the radiation transmittance according to the object etc. Further, it is possible to obtain a desirable radiation image even when the radiation dose to the object is reduced. Further, it is possible to obtain a radiation image having high image quality of high contrast, high sharpness and low noise etc. by once converting the light emitted from the stimulable phosphor into an electric signal, and processing the electric signal as desired. Particularly, when the radiation image is used for medical diagnosis, it is possible to obtain a radiation image processed in accordance with the portion of a human body such as the heart, the chest etc. and improve the diagnostic efficiency and accuracy.

However, in order to eliminate various influences based on the fluctuation of radiographic exposure conditions and/or obtain a radiation image having a high image quality of a high diagnostic efficiency and accuracy, it is necessary to investigate the image input condition of the radiation image stored in the stimulable phosphor sheet such as recording with a high or low radiation dose or the image input pattern, which is determined by the radiographic method such as portion image (e.g. chest and abdomen), plain image or contrasted image radiographing, before reproducing the radiation image to a visible image, and appropriately adjust the read-out gain or appropriately process the electric signal based on the investigated image input condition or the image input pattern. The image input condition and the image input pattern will hereinafter be simply referred to as the image input information when they should be expressed generically. It is also necessary to determine the scale factor to optimize the resolution according to the contrast of the image input pattern.

The investigation of the image input information may be conducted prior to the visible image reproduction by use of the method disclosed in U.S. Pat. No. 4,284,889, which is based on the finding that the amount of light instantaneously emitted from the stimulable phosphor sheet upon exposure thereof to a radiation is proportional to the amount of the radiation energy stored in the stimulable phosphor. In this method, image input information is investigated by detecting the instantaneously emitted light, and an appropriate signal processing is conducted based on the image input information in order to obtain a visible radiation image having an improved image quality, particularly a high diagnostic efficiency and accuracy. With this method, since it is possible to appropriately adjust the read-out gain, select an appropriate scale factor, or conduct an appropriate signal processing, a radiation image suitable for viewing and diagnostic purposes can be obtained regardless of fluctuation of the radiographic exposure conditions. However, since the recording of a radiation image on the stimulable phosphor sheet and read-out of the recorded image from the stimulable phosphor sheet are usually performed at different locations, a signal transfer system must be formed therebetween, necessitating a complicated apparatus and a high cost.

Further, U.S. Pat. No. 4,276,473 discloses a method of estimating the image input condition or image input pattern of a radiation image stored in the stimulable phosphor by positioning a non-stimulable phosphor in the vicinity of the stimulable phosphor sheet, and detecting the light emitted from the non-stimulable phosphor upon exposure thereof to a radiation by use of a photodetector. However, this method also has the same drawback as that of the method disclosed in aforesaid U.S. Pat. No. 4,284,889. Further, since the stimulable phosphor itself for recording the radiation image is not used as the detecting means for the image input information and it is only an indirect detecting means, it is impossible to obtain the image input information which is sufficiently reliable.

Various experiments conducted by the inventors revealed that a radiation image suitable for viewing, particularly for diagnostic purposes can be obtained regardless of fluctuation of the radiographic exposure conditions by conducting in advance a read-out operation for investigating the image input information of a radiation image stored in a stimulable phosphor (hereinafter referred to as the preliminary read-out) by use of stimulating rays having stimulation energy lower than stimulation energy of stimulating rays used in a read-out operation for obtaining a visible image for viewing, particularly for diagnostic purposes (hereinafter referred to as the final read-out), thereafter conducting the final read-out. In the final read-out, the read-out gain is adjusted, and/or the scale factor is determined, and/or the image processing conditions are determined appropriately based on the image input information obtained by the preliminary read-out. The read-out gain and the scale factor are together referred to as the read-out conditions. It has heretofore been considered necessary to detect as much light as possible with a photodetector, as described in U.S. Pat. Nos. 4,258,264, 4,302,671 and 4,346,295, since the amount of light emitted from the stimulable phosphor upon stimulation thereof by stimulating rays is very small even when the stimulable phosphor having the highest sensitivity among those available is selected. In view of the above state of the art, since it is beyond the imagination of the skilled in the art to dissipate intentionally the radiation energy stored in the stimulable phosphor for only the purpose of investigating the image input information, the above findings are unexpected.

On the basis of these findings, the inventors proposed in U.S. patent application Ser. No. 434,886 (European Patent Publication No. 77677) a method of and apparatus for reading out a radiation image in which, before conducting the final read-out for obtaining a visible image for viewing and diagnostic purposes, the preliminary read-out is carried out to investigate the image input information of the radiation image stored on the stimulable phosphor sheet by use of stimulating rays having stimulation energy lower than stimulation energy of stimulating rays used in the final read-out.

The stimulation energy referred to in this invention means the effective energy of the stimulating rays which the stimulable phosphor sheet receives per unit area.

In the method just described above, the stimulation energy of the stimulating rays applied to the stimulable phosphor in the preliminary read-out should be lower than the stimulation energy of the stimulating rays used in the final read-out. As the ratio of the stimulation energy of the stimulating rays in the preliminary read-out to the stimulation energy of the stimulating rays in the final read-out increases near to 1, the amount of the radiation energy remaining in the stimulable phosphor after the preliminary read-out decreases. It has been found that, when the ratio is smaller than 1, it is possible to obtain a radiation image suitable for viewing and diagnostic purposes by appropriately adjusting the read-out gain. However, in order to obtain a radiation image having an improved image quality, particularly a high diagnostic efficiency and accuracy, the aforesaid ratio should preferably be as small as possible insofar as the image input information of the radiation image stored in the stimulable phosphor can be detected sufficiently to determine the read-out conditions or the image processing conditions, that is, insofar as the light emitted from the stimulable phosphor in the preliminary read-out can be detected sufficiently for the above-mentioned purposes. Thus, the aforesaid stimulation energy ratio should generally be 50% or less, preferably 10% or less, more preferably 3% or less. The lower limit of this ratio is determined according to the accuracy of the system for detecting the light emitted from the stimulable phosphor in the preliminary read-out.

In order to make the stimulation energy of the stimulating rays in the preliminary read-out smaller than the stimulation energy of the stimulating rays in the final read-out, it is possible to use any known method. For example, the output level of the laser source used in the preliminary read-out may be decreased, the beam diameter of the laser beam may be increased, the scanning speed of the laser beam may be increased, or the moving speed of the stimulable phosphor sheet may be increased.

In the above-described method, since the image input condition of a radiation image stored in the stimulable phosphor can be investigated in advance, it is possible to obtain a radiation image having an improved image quality, particularly a high diagnostic efficiency and accuracy regardless of fluctuation of the radiographic exposure conditions by adjusting the read-out gain based on the investigated image input information without using a read-out system having a wide dynamic range. Further, since the image input pattern of the radiation image stored in the stimulable phosphor can be investigated in advance, it is possible to obtain a radiation image having an improved image quality, particularly a high diagnostic efficiency and accuracy by processing the read-out electric signal suitably according to the image input pattern. It is also possible to reduce the read-out time by omitting the final read-out for a portion of the stimulable phosphor carrying no image.

The above-mentioned method and apparatus have great technical effects as described above. However, when stimulation energy of the stimulating rays employed for the preliminary read-out is increased, the amount of radiation energy remaining in the stimulable phosphor at the time of the final read-out becomes small.

Therefore, in order to increase the amount of light emitted from the stimulable phosphor at the time of the final read-out and improve the signal-to-noise ratio of the image signal obtained, stimulation energy of the stimulating rays employed for the preliminary read-out must be minimized. In this case, it becomes impossible to detect the image input information of the radiation image stored in the stimulable phosphor by the preliminary read-out to an extent sufficient to determine the read-out conditions or the image processing conditions. Conversely, when stimulation energy of the stimulating rays employed for the preliminary read-out is increased to detect the image input information of the radiation image stored in the stimulable phosphor by the preliminary read-out to an extent sufficient to determine the read-out conditions or the image processing conditions, the amount of light emitted from the stimulable phosphor upon stimulation thereof at the time of the final read-out becomes small, and the signal-to-noise ratio of the image signal obtained is deteriorated. Since there is such a contradiction, the level of stimulation energy of the stimulating rays in the preliminary read-out has heretofore been determined at slight sacrifices of both amount of the image input information detected in the preliminary read-out and quality of the image obtained by the final read-out.

SUMMARY OF THE INVENTION

The primary object of the present invention is to provide a radiation image read-out method which provides a radiation image exhibiting a high signal-to-noise ratio even when preliminary read-out is conducted.

Another object of the present invention is to provide a radiation image read-out method in which image input information of the radiation image stored in a stimulable phosphor can be detected by the preliminary read-out to an extent sufficient to determine the read-out conditions and/or the image processing conditions without adversely affecting the signal-to-noise ratio of the image signal obtained in the final read-out.

The specific object of the present invention is to provide an apparatus for carrying out the above method.

Various experiments conducted by the inventors revealed that the above objects are accomplished by conducting the preliminary read-out by use of stimulating rays having a wavelength different from the wavelength of stimulating rays employed in the final read-out. It is known that the efficiency of light emission exhibited by the stimulable phosphor upon stimulation thereof differs according to the wavelength of the stimulating rays. However, it has further been found that, when the stimulable phosphor is exposed to stimulating rays having a certain wavelength to release a part of the radiation energy stored in the stimulable phosphor as light emission and thereafter exposed to stimulating rays to release the radiation energy remaining in the stimulable phosphor as light emission, the light emission efficiency obtained with stimulating rays having the same wavelength as the wavelength of the stimulating rays originally employed decreases considerably compared with the light emission efficiency originally obtained, but the light emission efficiency obtained with stimulating rays having a wavelength different from the wavelength of the stimulating rays originally employed does not significantly decrease. Although the cause of such a decrease in the light emission efficiency has not yet been clarified, it is presumed as described below. Namely, electrons or positive holes generated in the stimulable phosphor when the stimulable phosphor is exposed to a radiation such as X-rays are trapped in the form distributed about a certain trap energy level. When the stimulable phosphor is exposed to stimulating rays, mainly the electrons or the positive holes trapped on the trap energy level corresponding to the wavelength of the stimulating rays disappear, resulting in light emission from the stimulable phosphor. Therefore, when the wavelength of the stimulating rays employed in the first exposure of the stimulable phosphor (preliminary read-out) is different from the wavelength of the stimulating rays employed in the second exposure of the stimulable phosphor (final read-out), mainly the electrons or the positive holes trapped on trap energy levels different from each other disappear in the preliminary read-out and the final read-out. Accordingly, by conducting the preliminary read-out by use of stimulating rays having a wavelength different from the wavelength of the stimulating rays employed in the final read-out, it is possible to obtain a high light emission efficiency both in the preliminary read-out and in the final read-out. Since the amount of light emitted from the stimulable phosphor upon simulation thereof in the final read-out does not decrease to a large extent even when stimulating rays having a relatively high intensity are employed in the preliminary read-out, the above objects are accomplished in accordance with the present invention.

Accordingly, the present invention provides a radiation image read-out method in which, prior to final read-out for obtaining a visible image for viewing purposes from a stimulable phosphor sheet carrying a radiation image stored therein, preliminary read-out for reading out said radiation image stored in said stimulable phosphor sheet is conducted, wherein the improvement comprises conducting said preliminary read-out by use of stimulating rays having a wavelength different from the wavelength of stimulating rays employed in said final read-out. The present invention also provides an apparatus for carrying out the radiation image read-out method.

In the present invention, even when the stimulation energy of the stimulating rays employed in the preliminary read-out is increased considerably, the amount of light emitted by the stimulable phosphor upon stimulation thereof in the final read-out does not decrease to a large extent. Therefore, a radiation image exhibiting a high signal-to-noise ratio can be obtained, and the image input information of the radiation image stored in the stimulable phosphor can be detected by the preliminary read-out to an extent sufficient to determine the read-out conditions and/or the image processing conditions.

As described in U.S. Pat. No. 4,258,264, in order to discriminate the wavelength range of the stimulating rays from the wavelength range of the light emitted from the stimulable phosphor upon stimulation thereof and to efficiently detect very weak light emitted from the stimulable phosphor, the stimulable phosphor should preferably emit light having a wavelength within the range between 300 nm and 500 nm when exposed to stimulating rays having a wavelength within the range between 600 nm and 700 nm. The stimulable phosphor which emits light having a wavelength within the range between 300 nm and 500 nm when exposed to stimulating rays having a wavelength within the range between 600 nm and 700 nm exhibits light emission most efficiently when stimulated with light having a wavelength within the range between 600 nm and 700 nm. However, this stimulable phosphor exhibits light emission also when exposed to light having a wavelength outside the range between 600 nm and 700 nm. Therefor, for example, in order to discriminate the wavelength range of the stimulating rays from the wavelength range of the light emitted from the stimulable phosphor upon stimulation thereof and efficiently detect very weak light emitted from the stimulable phosphor at the preliminary read-out stage, the preliminary read-out may be conducted by use of stimulating rays having a wavelength longer than the wavelength of the stimulating rays employed in the final read-out.

For example, in order to conduct the preliminary read-out by use of the stimulating rays having a wavelength longer than the wavelength of the stimulating rays employed in the final read-out, a Kr laser beam (753 nm) may be used in the preliminary read-out, and a He-Ne laser beam may be used in the final read-out. However, it is of course possible to employ any other combinations of wavelengths of the stimulating rays for the preliminary read-out and the final read-out. An appropriate combination can be selected according to the dependence of the light emission efficiency of the stimulable phosphor upon the wavelength of the stimulating rays.

In the present invention, in order to improve the signal-to-noise ratio of the image signal obtained, it is preferable that the stimulable phosphor emits light having a wavelength range not overlapping the range of wavelength of the stimulating ray employed to excite the stimulable phosphor. Preferably, when a laser source which emits stimulating ray having a wavelength within the range between 600 nm and 700 nm is used, a stimulable phosphor which emits light having a wavelength within the range between 300 nm and 500 nm should be selected, as disclosed in U.S. Pat. No. 4,258,264.

As the stimulable phosphor, for example, rare earth element activated alkaline earth metal fluorohalide phosphor is preferred. One example of this phosphor is, as shown in DE-OS No. 2,928,245, a phosphor represented by the formula $(Ba_{1-x-y},Mg_x,Ca_y)FX:aEu^{2+}$ wherein X is at least one of Cl and Br, x and y are numbers satisfying $0<x+y\leq0.6$ and $xy\neq0$, and a is a number satisfying $10^{-6}\leq a\leq5\times10^{-2}$. Another example of this phosphor is, as shown in U.S. Pat. No. 4,239,968, a phosphor represented by the formula $Ba_{1-x},M^{II}_x)FX:yA$ wherein $M^{II}$ is at least one of Mg, Ca, Sr, Zn and Ce, X is at least one of Cl, Br and I, A is at least one of Eu, Tb, Ce, Tm, Dy, Pr, Ho, Nd, Yb and Er, x is a number satisfying $0\leq x\leq0.6\leq$, and y is a number satisfying $0\leq y\leq0.2$. Further, as the stimulable phosphor to be used in this invention can be used ZnS:Cu,Pb; $BaQ\cdot xAl_2O_3:Eu$ wherein $0.8\leq x\leq10$; and $M^{II}O\cdot xSiO_2:A$ wherein $M^{II}$ is Mg, Ca, Sr, Zn, Cd or Ba, A is Ce, Tb, Eu, Tm, Pb, Tl, Bi or Mn, and x is number satisfying $0.5\leq x\leq2.5$, as shown in U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0<x<0.1$, as shown in U.S. Pat. No. 4,236,078. Among the above enumerated phosphors, the rare earth element activated alkaline earth metal fluorohalide phosphor is the most preferable, among which barium fluorohalides are the most preferable in view of the high intensity of emission of light.

Further, barium fluorohalide phosphors added with a metal fluoride as disclosed in Japanese Unexamined Patent Publication Nos. 56(1981)-2385 and 56(1981)-2386, or barium fluorohalide phosphors added with at least one of a metal chloride, a metal bromide and a metal iodide as disclosed in European Patent Publication No. 29,963 are also preferable because of their improved light emitting characteristics.

It is also desirable to color the phosphor layer of the stimulable phosphor sheet made of the above phosphor by use of pigments or dyes to improve the sharpness of the image obtained thereby as disclosed in U.S. patent application Ser. No. 156,520 (European Patent Publication No. 21,174).

As for the signal processing, it is possible to employ a frequency processing as disclosed in U.S. Pat. No. 4,315,318, U.S. patent application Ser. No. 220,780, Japanese Unexamined Patent Publication Nos. 56(1981)-75137, 56(1981)-75139 and 56(1981)-75141, and a gradation processing as disclosed in U.S. Pat. Nos. 4,302,672, 4,276,473 or 4,310,886.

BRIEF DESCRIPTION OF THE DRAWINGS

FIG. 2 is a schematic view showing the whole system of the radiation image recording system in which another embodiment of the radiation image read-out method in accordance with the present invention is employed.

DESCRIPTION OF THE PREFERRED EMBODIMENTS

Figure 1:
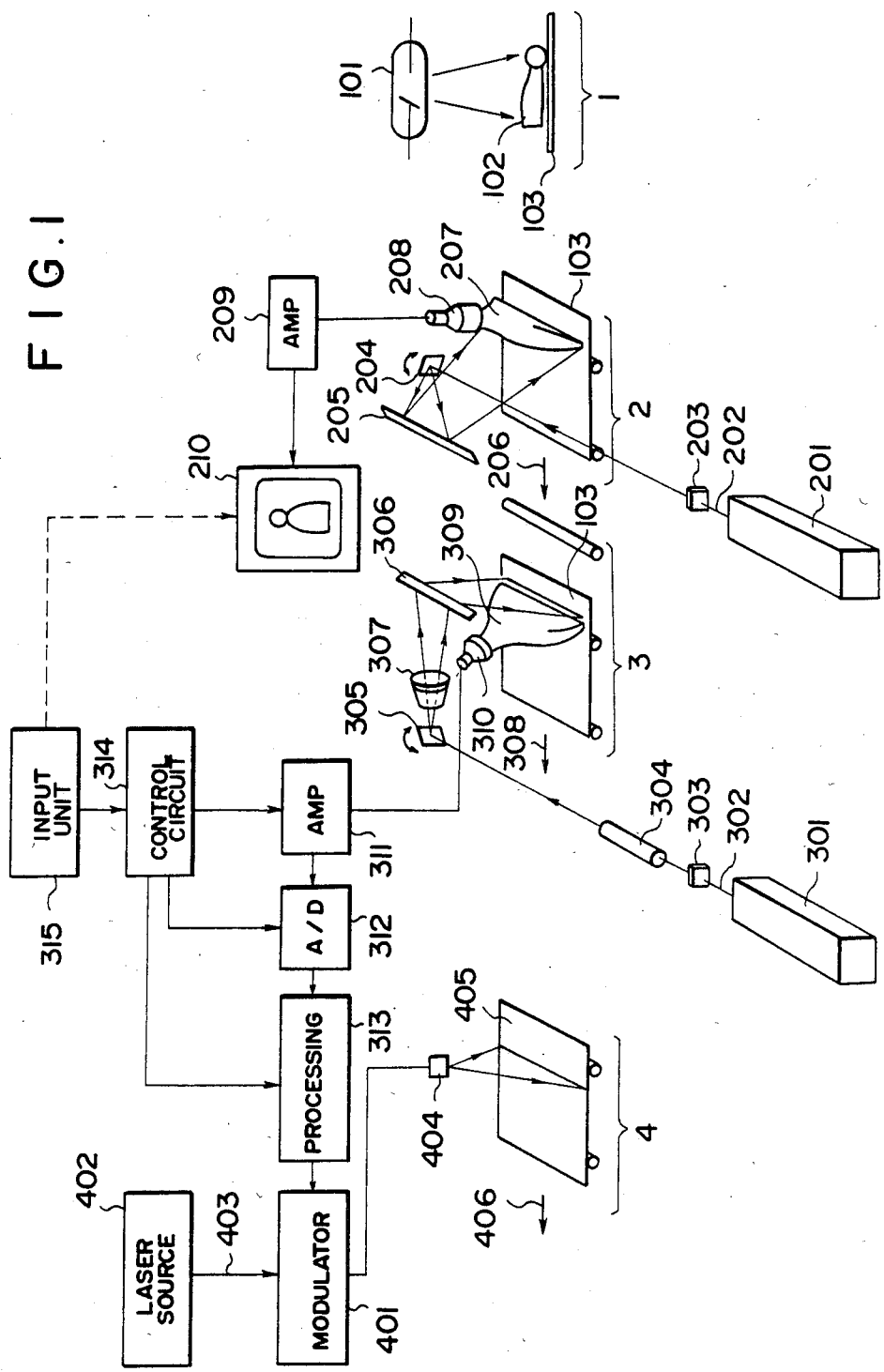
FIG. 1 is a schematic view showing the whole system of the radiation image recording system in which an embodiment of the radiation image read-out method in accordance with the present invention is employed.

The present invention will hereinbelow be described in further detail with reference to the accompanying drawings.

FIG. 1 schematically shows a radiation image recording system in which an embodiment of the radiation image read-out method in accordance with the present invention is employed, and which comprises a recording section 1, a preliminary read-out section 2, a final read-out section 3 and an image reproducing section 4.

In the recording section 1, X-rays emitted from an X-ray source 101 pass through an object 102 and are absorbed into a stimulable phosphor sheet 103 to have an X-ray image of the object 102 stored therein. The phosphor sheet 103 carrying the X-ray image stored therein is then sent to the preliminary read-out section 2.

In the preliminary read-out section 2, a laser beam 202 emitted from a laser source 201 is first passed through a filter 203 for cutting off the light beam having a wavelength within a range identical with the range of the wavelength of the light emitted from a stimulable phosphor sheet 103 upon stimulation by the laser beam 202. Then, the laser beam 202 is one-dimensionally deflected by a light deflector 204 such as galvanometer mirror and directed onto the stimulable phosphor sheet 103 by a plane reflection mirror 205. The laser source 201 is selected so that the laser beam 202 emitted therefrom has a wavelength distribution different from and far apart from the wavelength distribution of the light emitted from the phosphor sheet 103 upon stimulation thereof and the wavelength distribution of the stimulating rays employed in the final read-out. While the laser beam 202 impinges upon the stimulable phosphor sheet 103, the phosphor sheet 103 is moved in the direction of the arrow 206 (subsidiary scanning direction) and, consequently, the whole area of the phosphor sheet 103 is exposed to and scanned with the laser beam 202. When exposed to the laser beam 202, the stimulable phosphor sheet 103 emits light in proportion to the X-ray energy stored therein, and the emitted light enters a light guiding sheet 207. The light guiding sheet 207 has a linear light input face positioned close to the scanning line on the stimulable phosphor sheet 103, and a ring-shaped light output face in close contact with the light receiving face of a photodetector 208, which may be a photomultiplier. The light guiding sheet 207 is formed of a transparent thermoplastic resin sheet such as an acrylic resin sheet so that the light entering from the light input face can be effectively transmitted to the light output face by total reflection through the interior of the light guiding sheet 207. The light emitted from the stimulable phosphor sheet 103 upon stimulation thereof is guided in the interior of the light guiding sheet 207, emitted from the light output face of the light guiding sheet 207 and received by the photodetector 208. The light guiding sheet 207 may be of a shape and a material as disclosed in U.S. Pat. No. 4,346,295 (DE OS No. 2,951,501) or European Patent Publication No. 32,521.

The light receiving face of the photodetector 208 is provided with a filter for transmitting only the light having the wavelength distribution of the light emitted from the stimulable phosphor sheet 103 and cutting off the light having the wavelength distribution of the stimulating rays, so that the photodetector 208 can detect only the light emitted from the stimulable phosphor sheet 103 upon stimulation thereof. The output of the photodetector 208 is amplified by an amplifier 209 and displayed as a visible image on an output unit 210 such as a CRT. By watching the visible image, it is possible to detect the image input information of the X-ray image, i.e. the image input condition or the image input pattern prior to the final read-out. When the preliminary read-out is finished as described above, the stimulable phosphor sheet 103 is sent to the final read-out section 3.

In the final read-out section 3, a laser beam 302 emitted from a laser source 301 is first passed through a filter 303 for cutting off the light beam having a wavelength within the range identical with the range of the wavelength of the light emitted from the stimulable phosphor sheet 103 upon stimulation by the laser beam 302. Then, the beam diameter of the laser beam 302 is strictly adjusted by a beam expander 304. The laser beam 302 is then deflected by a light deflector 305 formed of a galvanometer mirror or the like, and directed onto the stimulable phosphor sheet 103 by a plane reflection mirror 306. Between the light deflector 305 and the plane reflection mirror 306 is positioned an fθ lens 307 for maintaining the beam diameter of the laser beam 302 uniform during the scanning of the laser beam 302 on the stimulable phosphor sheet 103. While the laser beam 302 impinges upon the stimulable phosphor sheet 103, the phosphor sheet 103 is moved in the direction of the arrow 308 (sub-scanning direction) and, consequently, the whole area of the phosphor sheet 103 is exposed to and scanned with the laser beam 302. Upon exposure to the laser beam 302, the stimulable phosphor sheet 103 emits light in proportion to the X-ray energy stored therein, and the light emitted enters a light guiding sheet 309 which is made of the same material and has the same construction as the light guiding sheet 207 used for preliminary read-out. The light emitted from the stimulable phosphor sheet 103 is guided in the interior of the light guiding sheet 309 through total reflection, emitted from the light output face of the light guiding sheet 309 and received by a photodetector 310. The light receiving face of the photodetector 310 is closely contacted with a filter for selectively transmitting only the light having the wavelength distribution of the light emitted from the stimulable phosphor sheet 103, so that the photodetector 310 can detect only the light emitted therefrom. The output of the photodetector 310 is amplified by an amplifier 311, A/D converted by an A/D converter 312, and processed by a signal processing circuit 313 to obtain an X-ray image having an improved image quality, particularly a high diagnostic efficiency and accuracy. The amplification degree of the amplifier 311, the scale factor of the A/D converter 312, and the signal processing conditions in the signal processing circuit 313 can be set to optimal values by manually operating a control circuit 314 with an input unit 315 based on the image input information investigated with the visible image obtained at the preliminary read-out section 2. Further, since the position of the phosphor sheet 103 relative to the radiation image read-out apparatus can be found by watching the visible image displayed on the output unit 210 such as a CRT, it is possible to accurately determine the relative position of the phosphor sheet 103 by installing a control zone prior to the final read-out system when a superposition method or a subtraction method requiring high precision positioning is used. The electric image signal obtained from the signal processing circuit 313 is sent to a light modulator 401 at the image reproducing section 4.

In the image reproducing section 4, a laser beam 403 emitted from a recording laser source 402 is modulated by the light modulator 401 based on the electric image signal, and directed onto a light-sensitive material 405 such as a photographic film by a scanning mirror 404 for scanning the light-sensitive material 405 with the laser beam 403. At this time, the light-sensitive material 405 is moved perpendicularly to the scanning direction, i.e. in the direction of the arrow 406. Accordingly, the X-ray image is recorded on the light-sensitive material 405.

FIG. 2 schematically shows a radiation image recording system in which another embodiment of the radiation image read-out method in accordance with the present invention is employed. In FIG. 2, similar elements are numbered with the same reference numerals with respect to FIG. 1. The embodiment shown in FIG. 2 is similar to that shown in FIG. 1, except that the read-out conditions in the final read-out, the image processing conditions, or the like are automatically controlled by use of the image input information of the X-ray image stored in the stimulable phosphor, which is obtained in the preliminary read-out. Namely, the light emitted from the phosphor sheet 103 upon stimulation thereof and detected by the photodetector 208 in the preliminary read-out is converted to an electric signal, and then amplified by the amplifier 209. The image input information of the X-ray image obtained from the amplifier 209 is sent to the control circuit 314 at the final read-out section 3. On the basis of the image input information, the control circuit 314 generates an amplification degree setting value (a), a scale factor setting value (b) and an image processing condition setting value (c). The light emitted from the phosphor sheet 103 and detected by the photodetector 310 in the final read-out is converted to an electric signal, amplified to an appropriate level by an amplifier 311 the sensitivity of which has been set by the amplification degree setting value (a), and then inputted into an A/D converter 312. In the A/D converter 312, the electric signal is converted to a digital signal with a scale factor which has been set by the scale factor setting value (b) to suit the width of signal fluctuation. The digital signal thus obtained is inputted into a signal processing circuit 313, in which it is processed based on the image processing condition setting value (c) so as to obtain an X-ray image suitable for viewing, particularly for diagnostic purposes. The image signal is then sent to the image reproducing section 4, in which the X-ray image is reproduced into a visible image in the same manner as described with reference to FIG. 1.

It should be understood that the present invention can be embodied in various ways other than the above described embodiments.

For example, in the embodiment shown in FIG. 1, the final read-out conditions are determined by manually operating the control circuit 314 based on the visible image obtained by the preliminary read-out. However, it is also possible to form the control system so that the visible image displayed on the output unit 210 such as CRT becomes suitable for viewing, particularly for diagnostic purposes according to the operation of the control circuit 314. In this case, it becomes easier to determine the conditions so that the control circuit 314 may effect adequate processings.

Further, instead of directly reproducing the radiation image by use of the laser source 402 at the image reproducing section 4, the final signal obtained at the final read-out section 3 may be displayed on a display device such as a CRT, or the final radiation image displayed on a CRT or the like may be recorded by use of a video tape recorder or a printer. Alternatively, the radiation image may be recorded on a thermosensitive recording material by use of heat wave, or may be recorded by any other known recording methods.

It is also possible to replace the laser sources 201 and 301 for emitting the stimulating rays in the preliminary read-out section 2 and in the final read-out section 3, respectively, by LED arrays having wavelength ranges different from each other and different from the wavelength range of the light emitted from the stimulable phosphor sheet upon stimulation thereof. In this case, the light deflectors 204 and 305 may be omitted.

Furthermore, instead of the photodetectors 208 and 310 provided with the light guiding sheets 207 and 309 respectively, a plurality of photomultipliers or phototransistors may be positioned along a straight line in the main scanning direction. It is also possible to expose the whole surface of the stimulable phosphor sheet to light at a time, and employ a photodetector capable of two-dimensionally detecting light, for example, a television camera, or the like.

Further, it is also possible to employ a single read-out apparatus for conducting both preliminary read-out and final read-out by changing the scanning conditions of the stimulating rays, and the like.

Further, the preliminary read-out may not always be conducted over the whole surface of the stimulable phosphor sheet. Normally, in the case of a radiograph, there is no image to be read out at the marginal portions of the phosphor sheet and, therefore, the preliminary read-out may be omitted for the marginal portions having a width of several centimeters. When the region carrying the necessary radiation image is known in advance, it is sufficient that only the region is read out preliminarily. Thus, it is possible to reduce the read-out time by conducting the preliminary read-out only for the necessary image region.

Instead of adjusting the read-out gain by changing the amplification degree of the amplifier connected to the photodetector, it is possible to use a photomultiplier as the photodetector and directly changing the gain of the photodetector by changing the voltage applied to the photomultiplier. This method is advantageous in that only the image signal is amplified, while noise is not amplified.

We claim:

1. A radiation image read-out method compromising: storing a radiation image in a stimulable phosphor sheet; conducting a preliminary read-out for reading out said radiation image stored in said stimulable phosphor sheet by use of stimulating rays having a wavelength different from the wavelength of rays used for image-wise exposure; and conducting a final read-out for obtaining a visible image for viewing purposes by using stimulating rays different from the wavelength of stimulating rays employed in said preliminary read-out.

2. A method as defined in claim 1 wherein image input information obtained by said preliminary read-out is monitored to determine read-out conditions for said final read-out and/or image processing conditions.

3. A method as defined in claim 1 wherein read-out conditions for said final read-out and/or image processing conditions are automatically determined based on image input information obtained by said preliminary read-out.

4. A method as defined in any of claims 1 to 3 wherein said preliminary read-out and said final read-out are conducted by scanning said stimulable phosphor sheet with respective stimulating rays.

5. A method as defined in any of claims 1 to 3 wherein said stimulating rays in said preliminary read-out and said final read-out are laser beams.

6. A radiation image read-out apparatus comprising: means for obtaining a radiation image stored in a stimulable phosphor sheet, first stimulating ray emitting means for emitting first stimulating rays of a wavelength to said stimulable phosphor sheet carrying said radiation image stored therein, said wavelength being different from the wavelength of rays used for image-wise exposure, preliminary read-out means for reading out light emitter from said stimulable phosphor sheet upon exposure thereof to said first stimulating rays, second stimulating ray emitting means for emitting second stimulating rays of a wavelength different from the wavelength of said stimulating rays employed in said preliminary read-out means, and final read-out means for reading out light emitted from said stimulable phosphor sheet in the pattern of the radiation image stored therein upon exposure thereof to said second stimulating rays.

7. An apparatus as defined in claim 6 wherein there is provided a monitor means for displaying an output of light detecting means for said preliminary read-out.

8. An apparatus as defined in claim 7 wherein there is provided an input means for inputting read-out conditions in final read-out and/or image processing conditions based on image input information obtained by said preliminary read-out.

9. An apparatus as defined in claim 6 wherein there is provided a control means for setting read-out conditions in final read-out and/or image processing conditions based on image input information obtained by said preliminary read-out.

10. An apparatus as defined in any of claims 6, 7 or 9 wherein said stimulating ray emitting means makes the stimulating rays scan on said stimulable phosphor sheet.

* * * * *